United States Patent Office 3,432,593
Patented Mar. 11, 1969

3,432,593
DELAYED AND SUSTAINED RELEASE TYPE
PHARMACEUTICAL PREPARATION
Mark Shepard, Miami, Fla., assignor to Key Pharmaceuticals, Inc., Miami, Fla., a corporation of Florida
No Drawing. Filed Sept. 18, 1963, Ser. No. 309,885
U.S. Cl. 424—20                    15 Claims
Int. Cl. A61k 27/12

ABSTRACT OF THE DISCLOSURE

A sustained release granule, capsule, or tablet has the active medicament adsorbed on a complex colloidal magnesium aluminum silicate. The individual granules may be further provided with one or more suitable retardant coatings, each of which provides a predetermined period of sustainment.

---

This invention relates to a novel sustained release type pharmaceutical preparation and to the method of its manufacture. More particularly, the invention concerns a sustained release type granule per se, capsule or tablet in which the active medicament is adsorbed on a complex colloidal magnesium aluminum silicate and then additionally treated for sustained release.

Sustained release or delayed action capsules or tablets usually comprise a multiplicity of medicated pellets or granules which are individually coated with one or more coatings which will postpone or delay action for a period of several hours during which the capsule or tablet passes through the stomach and the intestines, allowing for liberation at the desired point of the digestive system. The sustained action may be based upon either the number of coatings, or upon a system of coatings wherein the hourly release is predicated upon a percentage increase in weight of the carrier which is coated. A system of the latter type is disclosed in U.S. Patent 3,080,294.

In known types of sustained release pharmaceutical preparations, a central core, pellet or granule is employed, such consists of a mixture of sugar or corn starch, or other type of digestable starch, and the medicament is coated thereon, followed by spraying with a glaze type coating. Alternatively, the pellet may be composed of the medicament itself. Experience has shown tht the rate of release of the active medicament is nevertheless difficult to control, and it has been proposed to incorporate various mineral fillers in preparing sustained release tablets. Thus, for example, Canadian Patent 606,009 discloses aluminum hydroxide gel as a regulator of disintegration rate and as a buffer for this purpose. A disadvantage of aluminum hydroxide, however, is that constipation usually results when this substance is ingested in any substantial amount. Moreover, the use of aluminum hydroxide requires a binder. Further, aluminum hydroxide may induce phosphorus deficiency. Still further the regulatory factor would only be present in the stomach where acid is present, for aluminum hydroxide gel is alkaline in nature.

In accordance with the present invention, colloidal magnesium aluminum silicate is employed as an adsorbent in the preparation of sustained release pellets and granules. The medicament is adsorbed onto the surface of the magnesium aluminum silicate, and the resulting adsorbate may be formed into pellets or granules, which may be either uncoated or may be provided with one or more suitable coatings in a manner to be described hereinafter.

The use of colloidal magnesium aluminum silicate as an adsorbent for the medicament provides improved control of the release of the medicament within the digestive system, while at the same time it avoids constipative effects. One reason for this is that the colloidal magnesium aluminum silicate possesses acid neutralization capacity. Thus, when N/10 HCl is added slowly to a 1% dispersion of the colloidal magnesium aluminum silicate over a period of about 10 minutes, from 6 to 8 cc. of the acid are required to establish a pH of 4, per gram of colloidal magnesium aluminum silicate. The neutralization itself is of a delayed type, and when a dispersion of the colloidal magnesium aluminum silicate to which acid has been added is allowed to stand, the pH tends to return to a neutral value.

In addition to the slowing up of the digestive process in the stomach with the use of colloidal magnesium aluminum silicate, the digestive break-down in the intestinal tract is also retarded. The colloidal magnesium aluminum silicate is treated in a detailed manner which is described hereinafter with fats which tend to impart a water repellent quality which in itself is slow acting in the intestines.

Further it enables the utilization of materials heretofore difficult to place in pharmaceutical forms such as tablets. Substances of gummy, oleo-resinous and resinous characteristics such as lupulin, terpin hydrate, aspidium, benzoin, tolu and capsicum can now be placed in tablet form by adsorbing same upon the colloidal magnesium aluminum silicate in accordance with this invention.

Magnesium aluminum silicate does not react with phosphates and thus phosphorus depletion is avoided upon administration of this substance.

The colloidal magnesium aluminum silicate is employed in accordance with the invention in any suitable form, advantageously in the flaked form. In forming an adsorbate with a medicament, the magnesium aluminum silicate may be wetted with water, for example distilled water, and the mixture agitated until a pasty consistency is attained. The distilled water is preferably added slowly to the magnesium aluminum silicate to avoid achieving too thin a paste. Alcohol can be employed together with, or in substitution for, the water.

When the aforementioned paste has reached the required consistency, the therapeutically active ingredient or ingredients are added solwly, while maintaining a slow rate of agitation. The mass then tends to thicken. The thickened mass is allowed to stand without agitation for about 8 to 12 hours. This period of standing permits the mass to become dry to the touch, after which the mixture is removed and trayed. The trayed mixture is then dried under vacuum, avoiding the use of heat. This step may be performed in a tray type vacuum dryer, the chamber being evacuated to about 50 micron of mercury pressure. The trayed batch is preferably maintained under vacuum for about 24 hours. Upon removal from the vacuum chamber, the contents are thoroughly dry. The dried product comprises active medicament adsorbed on the colloidal magnesium aluminum silicate, and may be ground to any desired granular size to provide a uniform flowable mixture.

The complex magnesium aluminum sliciate employed in accordance with the invention is a compound of variable composition, having a general formula $$xMgO \cdot yAl_2O_3 \cdot zSiO_2 \cdot nH_2O$$

in which $x$, $y$, $z$ and represents integers. It may be prepared by reacting stoichiometrical quantities of a soluble aluminum salt, a soluble magnesium salt, and an alkali metal silicate, whereupon the complex is precipitated, separated and dried.

Complex magnesium aluminum silicates of this type are known to be antacids. However, it was found, in accordance with the present invention, that they are also adsorbents for various medicaments. It was further found that granule of complex magnesium aluminum silicate having a medicament adsorbed thereon can be additionally treated to provide a sustained release type capsule or tablet.

The colloidal magnesium aluminum silicate employed typically has an average chemical analysis as folows:

| Ingredient | Percent |
| --- | --- |
| Silicon dioxide | 61.1 |
| Magnesium oxide | 13.7 |
| Aluminum oxide | 9.3 |
| Titanium dioxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

In the stomach, where an acid medium is present, the colloidal magnesium aluminum silicate having the medicament adsorbed thereon forms a gel, which of itself exerts a retardant action upon the release of the medicament, slowing the rate of absorption of the medicament into the blood stream to as much as one-half the normal rate. A further retardant effect is provided by reason of the acid neutralization capacity of the colloidal magnesium aluminum silicate.

The colloidal magnesium aluminum silicate is employed, in accordance with the invention, in an amount ranging from about 40% to about 60% by weight of the amount of medicament to be adsorbed thereon, preferably about 50% by weight.

Any desired type of medicament may be adsorbed including herbs, botanicals, and various synthetic drugs, such as antihistamines, antibiotics, autonomics, cardiovascular agents, central nervous system depressants and stimulants, enzymes, gastrointestinal agents, hematological agents, immunological agents, harmones, renal acting and edema reducing agents, skeletal muscle relaxants, nutrients, and others.

The invention utilizes granular colloidal magnesium aluminum silicate as an adsorbent carrier for one or more active ingredients or medicaments. This eliminates the use of the basic pellets of the previously known types of delayed action capsules or tablets, in which the medicament is coated onto the pellet, and at the same time eliminates the coating step.

In accordance with one aspect of the invention, there is provided a sustained release granule comprising a medicament adsorbed on colloidal magnesium aluminum silicate.

In accordance with another aspect of the invention, there is provided a sustained release granule comprising an inner core of medicament adsorbed on colloidal magnesium aluminum silicate, having on its outer surface an enteric type coating.

In accordance with another aspect of the invention, there is provided a sustained release type pharmaceutical vehicle comprising an inner granule composed of a medicament adsorbed on colloidal magnesium aluminum silicate, said granules having at least one retardant coating thereon comprising a mixture of not less than about 95% by weight of said coating of a glyceride, and minor amounts of at least one fatty alcohol and of beeswax, the amount of the coating being between about 5% and about 15% by weight of that portion of the granule coated thereby, each such coating providing at least a one hour increment of sustainment.

In a granule of this type, the sustained action depends upon a percentage increase in weight of the carrier to be coated. This permits liberation of predetermined amounts of medicament from the coated granules, with successive release of the medicaments after a desired time interval. If desired, there can be provided an outer layer of enteric coating to encase the entire granule. Mixtures of granules are made up into tablets with a suitable binder, or into capsules.

As a retardant enteric coating there may be employed any pharmaceutically acceptable material which will withstand gastric acids, such as, for example, lac, zein, or cellulose acetate phthalate. A preferred coating composition is:

| Ingredient: | Amount, oz. |
| --- | --- |
| Cellulose acetate-phthalate | 13 |
| Diethyl phthalate dissolved in ½ gal. acetone, ½ gal. ethyl acetate, ¼ gal. isopropyl alcohol | 2 |

The foregoing solution provides resistance to acids, but not to the alkaline fluids in the intestinal system. Granules coated therewith will withstand stomach acids, passing through the stomach into the intestines, where the alkaline fluids will remove the coating, releasing or exposing the granules in from 1 to 3 hours. The coating solution is applied to the granules in an amount whereby the solids content of the solution is approximately 1% by weight of the granules coated. Care must be taken in applying the coating solution to prevent lumping of the granules. The coated granules are air dried in the rotating coating pan.

There is further provided, in accordance with the invention, a sustained release type granule comprising colloidal magnesium aluminum silicate having a medicament absorbed thereon, which is coated with a fat-wax type coating which is resistant both to acids and alkalis. For this purpose there is employed a fat-wax coating solution which preferably has the composition:

| Ingredient: | Percent by weight |
| --- | --- |
| Glyceryl monostearate | 95 |
| Myristyl alcohol | 1 |
| Cetyl alcohol | 1 |
| White beeswax, bleached | 3 |
| Chloroform to make a thin solution. | |

Depending upon the sustained release time desired, the fat-wax coating solution is applied to the medicament-magnesium aluminum silicaate granules in amounts whereby the solids content of the solution ranges from about 5% to about 15% by weight of the granules being coated. Thus, a coating of 5% will provide a release time of 1 to 3 hours, a coating of 10%, a release time of 3 to 5 hours, and a coating of 15%, a release time of 5 to 7 hours, said release taking place in the intestinal tract.

In the preparation of a sustained release type pharmaceutical vehicle, granules of a medicament absorbed on magnesium aluminum silicate, formed as previously described, and having a mesh size between about 10 and 20 mesh, are divided, for example, into five equal portions. The first portion of 20% by weight is set aside. A second 20% portion is coated in a rotating pan with an enteric coating type coating of the character described, and dried while tumbling in the pan with a blast of cool air. Care must be taken in applying the spray solution to avoid lumping of the medicated granules. The amount of coating solids is about 1% of the granules by weight. The second portion is then set aside.

The third 20% portion of the medicament-adsorbate is admixed with the above described glyceride-fatty alcohol-beeswax retardant solution until a gummy mass is obtained, the amount of solution used being sufficient to provide solids equal to about 5% of the total weight of the third 20% portion of the adsorbate granules. The product is vacuum dried and screened into granules. The fourth 20% portion is treated similarly to the third portion, except that the amount of solution employed is sufficient to provide solids equal to about 10% of the weight of treated granules. The fifth and final portion is similarly treated, except that the amount of solution employed is sufficient to provide about 15% solids of the total weight of treated granules. Thus, each granule is coated with a deposit having a fat-wax texture. The coating on the fourth and fifth portions will be correspondingly thicker than on the third portion. The coatings are also partially adsorbed by the magnesium aluminum silicate.

The third, fourth and fifth portions, after drying and screening, are coated with outer coatings of the previously described cellulose acetate-phthalate spray solution, which was applied to the second portion. This allows all portions except the first portion to withstand gastric acid action, and ensures that the third, fourth and fifth portions, which are resistant to both acid and alkaline media, will pass into the intestinal tract. The first portion will exhibit a release time ranging from immediate to one hour; the second portion from one to two hours; the third portion from three to five hours; the fourth portion from five to seven hours; and the fifth portion from seven to nine hours.

After all five portions have been blended, the mixture may be either encapsulated, or it may be compressed into tablets, using a suitable filler, binder, and lubricating material, in accordance with conventional methods.

The following examples serve to illustrate the practice of the invention, but are not to be regarded as limiting.

It will be seen from the examples that, in accordance with the invention, it is possible to admix uncoated granules of medicament adsorbed on magnesium aluminum silicate with enteric coated granules or with fat-wax coated granules, or with both, as desired. The invention permits taking advantage of the fact that the magnesium aluminum silicate itself acts as a retardant in the stomach, and that when treated with the fat-wax coating, it acts as a retardant in the intestines. By treating the granules of mangesium aluminum silicate having medicament adsorbed thereon with retardant coatings, the liberation rate of the medicament is further controlled, thus providing control of release rate to a greater extent than was heretofore possible in preparations of this type.

Example 1.—Vasodilator-tranquilizer combination, 10 hour release rate

A vasodilator-tranquilized combination having a ten hour release time was prepared in a batch size comprising 10,000 units. Each unit was designed to provide a dosage of 6.5 mg. nitroglycerine and 200 mg. lupulin N.F. The starting materials were:

| | Grams |
|---|---|
| Nitroglycerine (1 part nitroglycerine, 9 parts beta-lactose) | 650 |
| Lupulin N.F. VII | 2000 |
| Magnesium aluminum silicate (flake) | 1325 |

These materials were thoroughly mixed and allowed to stand for 8 to 12 hours, followed by vacuum drying and screening into granules. The granules were divided into five equal portions. The first portion, 795 grams, was set aside. The second portion was sprayed with cellulose acetate-phthalate solution to coat it with 1% solids, yielding a total weight of 802.95 grams. The third portion of 795 grams was coated with a retardant solution having the composition:

| | Grams |
|---|---|
| Glyceryl monostearate | 225.10 |
| Cetyl alcohol | 2.38 |
| Myristyl alcohol | 2.38 |
| Bleached white beeswax | 7.14 | in an amount sufficient to add 5% of fat wax solids or 39.75 grams, and then with cellulose acetate-phthalate solution to add 1% by weight of solids, or 8.35 grams, making the total weight of the treated third portion 843.10 grams.

The fourth portion of 795 grams of granules of adsorbate was treated with the retardant solution to add 10% fat wax solids or 79.50 grams, and then with cellulose acetate-phthalate to yield 1% solids or 8.74 grams, making a total weight of the treated fourth portion of 883.24 grams.

The fifth portion was similarly treated with retardant solution to add 15% fat wax solids or 118.75 grams, and an amount of cellulose acetate-phthalate solution to add 1% solids or 9.14 grams, making the total weight of this portion 922.89 grams. The third, fourth and fifth portions were then vacuum dried and screened into granules. All five portions were then blended, yielding a total weight of 4,247.18 grams.

The mixture was tabletted by including conventional binder, filler and lubricant and compressing to provide a tablet containing a dosage of 6.5 mg. nitroglycerine and 200 mg. lupulin. A similar batch was made into capsules, each containing 0.4247 grams to yield the same individual dosage.

Example 2.—Analgesic combination

An analgesic combination having a 10 hour release time was prepared in a batch size of 10,000 units. Each unit was designed to provide a dosage of 30 mg. dihydrocodein bitartrate and 200 mg. lupulin N.F. VII, with immediate release of the codein derivative and sustained 10 hour release of lupulin.

The starting materials were:

| | Grams |
|---|---|
| Lupulin N.F. VII | 2,000 |
| Dihydrocodein bitartrate | 300 |
| Magnesium aluminum silicate | 1,000 |

The lupulin was added to the wet magnesium aluminum silicate, blended well and allowed to stand prior to vacuum drying. The dried material was screened into granules, and divided into 5 equal portions of 600 grams each.

The first portion was admixed with 300 gm. dihydrocodein bitartrate, making a total of 900 gm. The second portion of 600 gm. was spray coated with 1% cellulose acetate phthalate enteric coating solution. The third portion was treated with fat-wax retardant solution to add 5% by weight as in Example 1 (30 gm.), dried and screened, giving 630 gm. which were spray coated with enteric solution to add 1% by weight making 636.3 gm. The fourth portion of 600 gm. was coated with 60 gm. or an added 10% by weight of fat-wax retardant, dried and screened, yielding 660 gm., which were spray coated with 1% enteric solution, making a total of 666.6 gm. The fifth portion was coated with an added 15% by weight of fat-wax retardant, 90 gm., dried, screened and coated with enteric solution to add 1% by weight, making a total of 696.6 gm. The fat-wax solution employed to coat portions 3, 4, and 5 had the composition:

| | Grams |
|---|---|
| Glycerol monostearate (95%) | 171 |
| Cetyl alcohol (1%) | 1.8 |
| Myristyl alcohol (1%) | 1.8 |
| Bleached white beeswax (3%) | 5.4 |

The total weight of portions 1–5 was 3,505.8 gm.

When encapsulated, each capsule contains 0.3505 gm., yielding a dosage of 30 mg. dihydrocodein bitartrate and 200 mg. lupulin. The codein compound having no protective coating is available for absorption into the system immediately. The lupulin becomes available for absorption over a 10 hour period. Tablets may be prepared by adding filler, binder and lubricants to the blended 5 portions, and compressing. They may be coated or uncoated and will yield the same absorption rates.

Example 3.—Antihistamine-tranquilizer combination

A combination having a total batch size of 10,000 units, each unit providing a dosage of 30 mg. pyrilamine maleate and 200 mg. lupulin N.F. VII, was prepared from the following:

| | Grams |
|---|---|
| Pyrilamine maleate | 300 |
| Lupulin N.F. VII | 2,000 |
| Magnesium aluminum silicate | 1,150 |

This combination is designed to release half the medication upon ingestion and the balance after a four hour period. The 2300 gm. of active ingredients were adsorbed on 1150 gm. of wet flake magnesium aluminum silicate, allowed to stand and vacuum dried. The dried material was screened into granules and divided into two equal portions. The first portion was set aside. The second portion was treated with fat-wax retardant solution having the percentage composition mentioned in the previous example, containing a total of 172.5 gm. solids to yield a 10% weight increase. After vacuum drying, the second portion was spray coated with cellulose acetate phthalate enteric coating to add 1% by weight.

When portions 1 and 2 are blended and placed into a tablet or capsule, upon ingestion, the first portion granules will provide immediate release of medicament. The portion 2 granules pass through the stomach, enter the intestines, the enteric coating thereon is dissolved, exposing the fat-wax coating, which gradually disintegrates over a four hour period, allowing the medication to be released into the system.

Example 4.—Alkaloid-tranquilizer combination

A batch size of 10,000 units, each unit containing 2 mg. ergotamine and 20 mg. lupulin was prepared from the following:

|  | Grams |
|---|---|
| Lupulin | 2,000 |
| Ergotamine | 20 |
| Magnesium aluminum silicate | 1,010 |

A first portion was prepared by adsorbing 400 gm. lupulin onto 200 gm. magnesium aluminum silicate, followed by standing, vacuum drying, and screening into granules. To this mixture there was added 10 gm. of the ergotamine. A second portion was made from 400 gm. lupulin as before, with 200 gm. magnesium aluminum silicate, and the granules spray coated with enteric cellulose acetate phthalate solution to a weight increase of 1%.

A third portion was prepared as before, and then the granules coated with fat-wax to an added weight of 5% (30 gm.) using the solution described in the previous examples, dried and screened into granules, and coated to a 1% weight increase with enteric coating solution. A fourth portion was prepared by adsorbing onto 205 gm. of magnesium aluminum silicate, 10 gm. of ergotamine and 400 gm. lupulin, the granules being treated to a 10% weight increase with the fat-wax solution and then to a 1% weight increase with enteric solution. A fifth portion was prepared using 400 gm. lupulin and 200 gm. magnesium aluminum silicate, the granules being coated to a 1% weight increase with fat-wax solution and with 1% weight increase of enteric coating. The total fat-wax solids used were 181.5 gm.

After the five portions were blended, the total weight was 3232.765 gm., each 0.3232 gm. yielding a dosage of 20 mg. ergotamine and 200 mg. lupulin. The ergotamine will release 1 mg. upon ingestion, and after 4 hours the other 1 mg. entrapped in the granules of portion 4 becomes available. The lupulin is released commencing with ingestion over an 8–10 hour period.

Example 5.—Antiarthritic-tranquilizer combination

A three-active ingredient tablet or capsule, providing release of one medicament up to a 8–10 hour period, and the other two medicaments released at specified times, one-third immediately, one-third at about 4–5 hours, and one-third at about 8–10 hours, was prepared to provide 10,000 dosage units.

The ingredients were:

|  | Grams |
|---|---|
| Lupulin | 2,000 |
| Mephenesin | 1,500 |
| Acetaminophen | 1,500 |
| Magnesium aluminum silicate | 2,500 |

Each tablet or capsule is designed to contain 200 mg. lupulin, 150 mg. mephenesin, and 150 mg. acetaminophen. A first portion was prepared by adsorbing 400 gm. lupulin, 500 gm. mephenesin and 500 gm. acetaminophen onto 700 gm. magnesium aluminum silicate, allowing to stand, drying and screening into granules. A second portion was prepared by adsorbing 400 gm. lupulin onto 200 gm. magnesium aluminum silicate, allowing to stand, and vacuum drying, screening into granules and coating with cellulose acetate phthalate enteric solution to a 1% weight increase, giving a total of 606 gm. A third portion was made by adsorbing as in the first portion, and coating the granules to a 5% weight increase with fat-wax retardant as in the preceding examples, drying, screening and further coating to a 1% weight increase with enteric coating. A fourth portion was made by adsorbing 400 gm. lupulin onto 200 gm. magnesium aluminum silicate, and the granules were coated to a 10% by weight increase with fat-wax retardant solution, and then coated to a 1% weight increase with enteric coating. A fifth portion was prepared by adsorbing the remainder of 500 gm. mephenesin, 500 gm. acetaminophen and 400 gm. lupulin onto the remaining 700 gm. magnesium aluminum silicate, drying, screening to granules, and coating with fat-wax solution to a 15% weight increase, and treating to a 1% weight increase with enteric coating. The five portions were blended, totaling 8038.21 gm. In either tablet or capsule form, each dosage upon ingestion yields 200 mg. lupulin, 150 mg. mephenesin, and 150 mg. acetaminophen. The lupulin becomes available in the system over a period of 8–10 hours. The mephenesin and acetaminophen release one-third upon ingestion, one-third after the fourth hour, and the last third after the eighth hour.

Example 6.—Antispasmodic-tranquilizer combination

To produce 10,000 tablets or capsules, each containing a unit dosage of 200 mg. lupulin, 1 mg. scopolamine, and 15 mg. belladonna extract, the following ingredients were employed:

|  | Grams |
|---|---|
| Lupulin | 2,000 |
| Scopolamine | 10 |
| Belladonna extract | 150 |
| Magnesium aluminum silicate | 1,080 |

A first portion was prepared by adsorbing 400 gm. lupulin and 10 gm. scopolamine onto 205 gm. magnesium aluminum silicate, allowing to stand, vacuum drying, and screening into granules. A second portion was made by adsorbing 400 gm. lupulin and 50 gm. belladonna extract onto 225 gm. magnesium aluminum silicate, granulated as before, and coated to a 1% weight increase with cellulose acetate phthalate enteric solution. A third portion was prepared by adsorbing 400 gm. lupulin and 500 gm. belladonna extract onto 225 gm. magnesium aluminum silicate, granulated as before, and treated to a 5% weight increase with fat-wax retardant solution, screened into granules after drying, and the granules coated to a 1% weight increase with enteric coating. A fourth portion was made by adsorbing 400 gm. lupulin and the balance of the belladonna extract, 50 gm. onto 225 gm. magnesium aluminum silicate, allowing to stand, drying and screening into granules. These were treated to a 10% weight increase with fat-wax retardant solution, and then to 1% weight increase with enteric coating. A fifth portion was made by adsorbing the 400 gm. remaining lupulin onto 200 gm. magnesium aluminum silicate. The granules were treated to a 1% weight increase with fat-wax retardant solution and further to a 1% weight increase with enteric coating solution. Upon blending the five portions, totaling 3459.4 gm., each unit dosage provides 200 mg. lupulin, 1 mg. scopolamine and 15 mg., belladonna extract. The 1 mg. scopolamine is available upon ingestion. The belladonna extract is released for absorption into the system in equal one-third amounts in the second, fourth and sixth hours, and the lupulin becomes available over a period of up to 10 hours.

Example 7.—Antibiotic-penicillin

In order to prepare 10,000 capsules or tablets, each to provide a 250 mg. dosage of penicillin, there were employed:

| | Grams |
|---|---|
| Penicillin | 2,500 |
| Magnesium aluminum silicate | 1,250 |

The penicillin was adsorbed onto the magnesium aluminum silicate wetted by alcohol, the mixture allowed to stand, vacuum dried, and screened into granules. The granules were divided into four equal portions of 937.5 gm. each. The first portion was treated to a weight increase of 1% with enteric coating solution (cellulose acetate phthalate) and set aside. If desired, material thus prepared could be compressed to form tablets, per se. A second portion of 937.5 gm. was treated to a 5% weight increase with fat-wax retardant solution and then after drying and granulation to a 1% increase in weight with enteric solution. The third portion was coated to a 10% weight increase with fat-wax retardant solution, granulated and treated to a 1% weight increase with enteric coating solution. The fourth portion was coated with retardant fat-wax to a 15% weight increase and coated with enteric solution as before. The four portions were blended, totaling 4071.561 gm. Each tablet or capsule prepared therefrom, containing a dosage of 407.156 mg., yielding upon ingestion 250 mg. of penicillin. The pinicillin, due to the enteric seal, becomes available in the system after leaving the stomach, continuing to release additional penicillin up to a 8–10 hour period.

What is claimed is:

1. A sustained release type pharmaceutical vehicle which will not withstand gastric action and which will exhibit a drug release time ranging from immediate upon ingestion to about one hour comprising an uncoated granule of a colloidal magnesium aluminum silicate having acid neutralizing capacity sufficient to provide a retardant effect on the rate of medicament absorption into the blood stream and having adsorbed thereon a predetermined effective dosage unit quantity of at least one medicament, having gummy, oleo-resinous and/or resinous characteristics, said vehicle forming a gel in the acid medium present in the stomach which gel of itself exerts a retardant action upon the release of the medicament sufficient to slow down the rate of absorption of the medicament into the blood stream to as much as one-half of the normal rate.

2. A sustained release type pharmaceutical vehicle which will not withstand gastric action and which will exhibit a drug release time ranging from immediate upon ingestion to about one hour comprising an uncoated granule of a colloidal magnesium aluminum silicate having acid neutralizing capacity sufficient to provide a retardant effect on the rate of medicament absorption into the blood stream and having adsorbed thereon between about 40% and about 60% by weight of a predetermined effective dosage unit quantity of at least one medicament having gummy, oleo-resinous and/or resinous characteristics, said vehicle forming a gel in the acid medium present in the stomach which gel of itself exerts a retardant action upon the release of the medicament sufficient to slow down the rate of absorption of the medicament into the blood stream to as much as one-half of the normal rate.

3. A sustained release type pharmaceutical vehicle comprising an inner granule of a predetermined effective dosage unit quantity of at least one medicament having gummy, oleo-resinous and/or resinous characteristics, adsorbed on a colloidal magnesium aluminum silicate having on its outer surface an enteric coating selected from the group consisting of lac, zein, and cellulose acetate-phthalate.

4. A sustained release type pharmaceutical vehicle comprising an inner granule of a predetermined effective dosage unit quantity of at least one medicament having gummy, oleo-resinous and/or resinous characteristics, adsorbed on a colloidal magnesium aluminum silicate, said granule having at least one retardant coating thereon comprising a mixture of not less than about 95% by weight of said coating of a glyceride, and minor amounts of at least one fatty alcohol and of beeswax, the amount of said coating being between about 5% and about 15% by weight of that portion of the granule coated thereby, such coating providing at least a one hour increment of sustainment.

5. The vehicle of claim 4 in which the amount of retardant coating is sufficient to provide an increment of sustainment of about 3 hours.

6. The vehicle of claim 4 in which the granule has on its outer surface an enteric coating.

7. A sustained release type pharmaceutical vehicle comprising a mixture of (a) granules comprising a predetermined effective dosage unit quantity of at least one medicament having gummy, oleo-resinous and/or resinous characteristictics adsorbed on colloidal magnesium aluminum silicate, (b) granules comprising a predetermined effective dosage unit quantity of at least one medicament having gummy, oleo-resinous and/or resinous characteristics adsorbed on colloidal magnesium aluminum silicate having on their outer surface an enteric type coating selected from the group consisting of lac, zein and cellulose acetate-phthalate, and (c) granules comprising a predetermined effective dosage unit quantity of at least one medicament having gummy, oleo-resinous and/or resinous characteristics adsorbed on colloidal magnesium aluminum silicate having at least one retardant coating thereon comprising a mixture of not less than about 95% by weight of said coating of a glyceride, and minor amounts of at least one fatty alcohol and of beeswax, the amount of said coating being between about 5% and about 15% by weight of that portion of the granule coated thereby.

8. The vehicle of claim 7 in the form of a pharmaceutical tablet.

9. The vehicle of claim 7 in the form of a pharmaceutical capsule.

10. A sustained release type pharmaceutical vehicle comprising a mixture of (a) granules comprising a predetermined effective dosage unit quantity of at least one medicament having gummy, oleo-resinous and/or resinous characteristics adsorbed on colloidal magnesium aluminum silicate, and (b) granules comprising a predetermined effective dosage unit quantity of at least one medicament having gummy, oleo-resinous and/or resinous characteristics adsorbed on colloidal magnesium aluminum silicate having at least one retardant coating thereon comprising a mixture of not less than about 95% by weight of said coating of a glyceride, and minor amounts of at least one fatty alcohol and of beeswax, the amount of said coating being between about 5% and about 15% by weight of that portion of the granule coated thereby.

11. The vehicle of claim 10 in the form of a pharmaceutical tablet.

12. The vehicle of claim 10 in the form of a pharmaceutical capsule.

13. A sustained release type pharmaceutical vehicle comprising a mixture of (a) granules comprising a predetermined effective dosage unit quantity of at least one medicament having gummy, oleo-resinous and/or resinous characteristics adsorbed on colloidal magnesium aluminum silicate having on their outer surface an enteric type coating selected from the group consisting of lac, zein and cellulose acetate-phthalate, and (b) granules comprising a predetermined effective dosage unit quantity of at least one medicament having gummy, oleo-resinous and/ or resinous characteristics adsorbed on colloidal magnesium aluminum silicate having at least one retardant coating thereon comprising a mixture of not less than about 95% by weight of said coating of a glyceride, and minor amounts of at least one fatty alcohol and of beeswax, the amount of said coating being between about 5% and about 15% by weight of that portion of the granule coated thereby.

14. The vehicle of claim 13 in the form of a pharmaceutical tablet.

15. The vehicle of claim 13 in the form of a pharmaceutical capsule.

References Cited

UNITED STATES PATENTS

| | | | |
|---|---|---|---|
| 3,109,775 | 11/1963 | Shepard et al. | 167—82 |
| 3,140,978 | 7/1964 | Zentner | 167—55 |
| 3,248,290 | 4/1966 | Zentner | 167—55 |
| 3,337,403 | 8/1967 | Zentner | 167—55 |
| 2,970,889 | 2/1961 | Ishino et al. | |
| 3,032,394 | 5/1962 | Ishino et al. | |
| 3,080,294 | 3/1963 | Shepard | 167—82 |

LEWIS GOTTS, *Primary Examiner.*

S. K. ROSE, *Assistant Examiner.*

U.S. Cl. X.R.

424—23, 22